(12) United States Patent
Kwon

(10) Patent No.: US 10,683,029 B2
(45) Date of Patent: Jun. 16, 2020

(54) STEERING COLUMN

(71) Applicant: MANDO CORPORATION, Pyeongtaek-si, Gyeonggi-do (KR)

(72) Inventor: HyunBi Kwon, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 150 days.

(21) Appl. No.: 15/878,899

(22) Filed: Jan. 24, 2018

(65) Prior Publication Data

US 2018/0208233 A1 Jul. 26, 2018

(30) Foreign Application Priority Data

Jan. 26, 2017 (KR) .................... 10-2017-0012721
Aug. 16, 2017 (KR) .................... 10-2017-0103839

(51) Int. Cl.
*B62D 1/19* (2006.01)
*B62D 1/184* (2006.01)
*B62D 1/185* (2006.01)

(52) U.S. Cl.
CPC ............. *B62D 1/192* (2013.01); *B62D 1/184* (2013.01); *B62D 1/185* (2013.01); *B62D 1/195* (2013.01)

(58) Field of Classification Search
CPC ........ B62D 1/192; B62D 1/195; B62D 1/184; B62D 1/185
See application file for complete search history.

(56) References Cited

U.S. PATENT DOCUMENTS

2004/0261565 A1* 12/2004 Uphaus .................. B62D 1/184
74/493
2012/0024101 A1 2/2012 Schnitzer et al.
(Continued)

FOREIGN PATENT DOCUMENTS

KR 10-2015-0017917 A 2/2015
KR 10-1559821 A 10/2015

OTHER PUBLICATIONS

Korean Office Action dated Oct. 2, 2018 issued in Korean Patent Application No. 10-2017-013839.
(Continued)

*Primary Examiner* — Darlene P Condra
(74) *Attorney, Agent, or Firm* — Morgan, Lewis & Bockius LLP

(57) ABSTRACT

The present disclosure provides a steering column of a vehicle, the steering column including: a fixed gear disposed on the outer side of an inner tube, in which a steering shaft is inserted, in the axial direction of the steering column, and having a plurality of telescopic motion stop holes arranged in the axial direction of the steering column; a movable gear inserted into or separated out of the telescopic motion stop holes; an outer tube fitted on the inner tube such that the inner tube can slide in the axial direction of the steering column, and having distance members disposed at both sides of the fixed gear; a lever bolt disposed through the distance members and supporting the movable gear such that the fixed gear and the movable gear are coupled to or separated from each other when a control lever is tightened or loosened; and a load-absorbing unit comprising a guide block coupled to the outer tube and a first load-absorbing member coupled to the movable gear to be able to slide in the axial direction of the steering column on the guide block.

18 Claims, 9 Drawing Sheets

(56) References Cited

U.S. PATENT DOCUMENTS

| | | | |
|---|---|---|---|
| 2013/0327176 A1 | 12/2013 | Domig et al. | |
| 2014/0251059 A1* | 9/2014 | Russell | B62D 1/195 74/492 |
| 2015/0128752 A1* | 5/2015 | Buzzard | F16F 7/128 74/493 |
| 2016/0001809 A1* | 1/2016 | Kingston-Jones | B62D 1/195 74/492 |
| 2016/0159387 A1* | 6/2016 | Okano | B62D 1/184 74/493 |
| 2017/0050665 A1* | 2/2017 | Appleyard | B62D 1/192 |
| 2017/0355392 A1* | 12/2017 | Nagatani | B62D 1/184 |
| 2018/0057038 A1* | 3/2018 | Kingston-Jones | F16F 7/123 |
| 2019/0185043 A1* | 6/2019 | Bueker | B62D 1/184 |

OTHER PUBLICATIONS

Office Action issued in corresponding German Application No. 10 2018 201 198.2, dated Mar. 28, 2019.

\* cited by examiner

STEERING COLUMN

CROSS REFERENCE TO RELATED APPLICATION

This application claims priority from Korean Patent Application No. 10-2017-0012721, filed on Jan. 26, 2017, and Korean Patent Application No. 10-2017-0103839, filed on Aug. 16, 2017, which are hereby incorporated by reference for all purposes as if fully set forth herein.

BACKGROUND OF THE INVENTION

1. Field of the Invention

The present disclosure relates to a steering column of a vehicle and, more particularly, to a steering column of a vehicle that can telescope.

2. Description of the Prior Art

Recently, vehicles are equipped with a steering column additionally having a telescoping or tilting function for the convenience of drivers. A telescopic device is a device allowing a steering column to axially stretch and contract and a tilting device is a device for adjusting the angle of a steering column.

Automotive steering systems generally include a steering shaft, a steering column fitted on the steering shaft, a mounting bracket fixing the steering column to a car body, a distance member mounted on the steering column to allow a telescopic motion of the steering column, a fixed gear fixed on the distance member in close contact with it, a movable gear engaged with the fixed gear, a lever bolt disposed through the distance member, and a locking unit coupled to an end of the lever bolt.

The telescopic motion of the steering column is made by tightening and loosening a control lever. When the control lever is tightened, the movable gear is engaged with the fixed gear by a coupling force of the locking unit at the end of the lever bolt, thereby restricting the telescopic motion. When the control lever is loosened, the fixed gear and the movable gear are disengaged, thereby allowing the telescopic motion.

However, according to steering columns in the related art, there is a problem in that the lever bolt is not locked due to a tooth-on-tooth connection in which the ridges of the fixed gear are positioned on the ridges of the movable gear. In this case, the sense of operating the lever by a driver is deteriorated, and in the worst case, the gears may become broken and the driver may become upset.

Further, the steering column is not stably fixed due to the tooth-to-tooth connection, so there is a problem that the steering column may pop up and the safety of the driver cannot be secured in a collision or a rear-end collision of a vehicle.

SUMMARY OF THE INVENTION

Embodiments have been made under this background and an aspect of the present disclosure is to provide a steering column of a vehicle in which a fixed gear and a movable gear can be stably engaged with each other when the steering column is locked to be restricted in telescopic motion.

Another aspect of the present disclosure is to provide a steering column of a vehicle, the steering column being able to stably absorb a collision load when the collision load is applied to the steering column due to a collision or a rear-end collision of a vehicle.

The aspects of the present disclosure are not limited thereto, and other aspects and advantages of the present disclosure will be understood from the following description.

A steering column of a vehicle according to the present disclosure includes: a fixed gear disposed on the outer side of an inner tube, in which a steering shaft is inserted, in the axial direction of the steering column, and has a plurality of telescopic motion stop holes arranged in the axial direction of the steering column; a movable gear inserted into or separated out of the telescopic motion stop holes; an outer tube fitted on the inner tube such that the inner tube can slide in the axial direction of the steering column, and has distance members disposed at both sides of the fixed gear; a lever bolt disposed through the distance members and supporting the movable gear such that the fixed gear and the movable gear are coupled to or separated from each other when a control lever is tightened or loosened; and a load-absorbing unit comprising a guide block coupled to the outer tube and a first load-absorbing member coupled to the movable gear to be able to slide in the axial direction of the steering column on the guide block.

According to the present disclosure, even if the locking projection of the movable gear is positioned between the telescopic motion stop holes of the fixed gear in a telescopic motion-locked state, the movable gear keeps pressing the fixed gear by its elasticity and is then inserted into an adjacent telescopic motion stop hole of the fixed gear when a predetermined shock etc. is applied in the axial direction of the steering column, so the steering column can be stably locked.

Further, according to the present disclosure, when a collision load of a set range or more is applied to the steering column due to a collision or a rear-end collision of a vehicle, the collision load applied to the steering column is absorbed by the load-absorbing unit, so popping-up of the steering column due to external shock is prevented, whereby it is possible to secure the safety of a driver.

The effects of the present disclosure are not limited thereto and it should be understood that the effects include all effects that can be inferred from the configuration of the present disclosure described in the following specification or claims.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Figure 1:
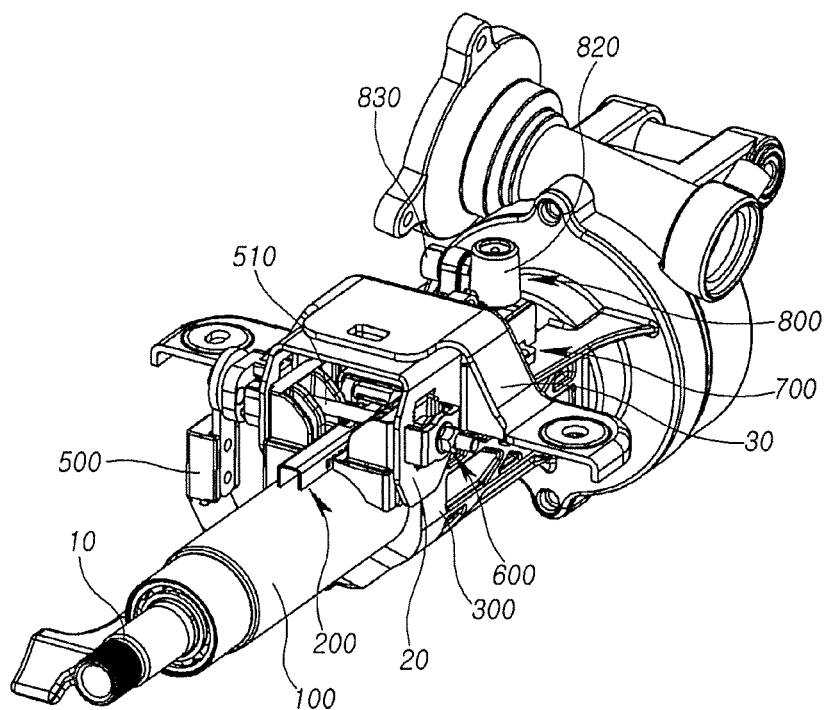
FIG. 1 is a perspective view of a steering column of a vehicle according to embodiments.

Hereinafter, embodiments will be described with reference to the accompanying drawings. However, the present disclosure may be modified in various different ways and is not limited to the embodiments described herein. Further, parts irrelevant to the present disclosure are omitted in the drawings to make the present disclosure clear and the same reference numerals are designated to the same or similar components throughout the specification.

In embodiments of the present disclosure, when it is described that an element is "connected" to another element, not only the first element may be "connected directly" to the second element, but the first element may also be "electrically connected" to the second element while a third element is interposed therebetween. In the entire specification of the present application, when it is described that a certain unit "includes" a certain element, this means that the unit may include any other element rather than exclude the any other element unless otherwise described.

Hereinafter, embodiments are described in detail with reference to the accompanying drawings.

Figure 2:
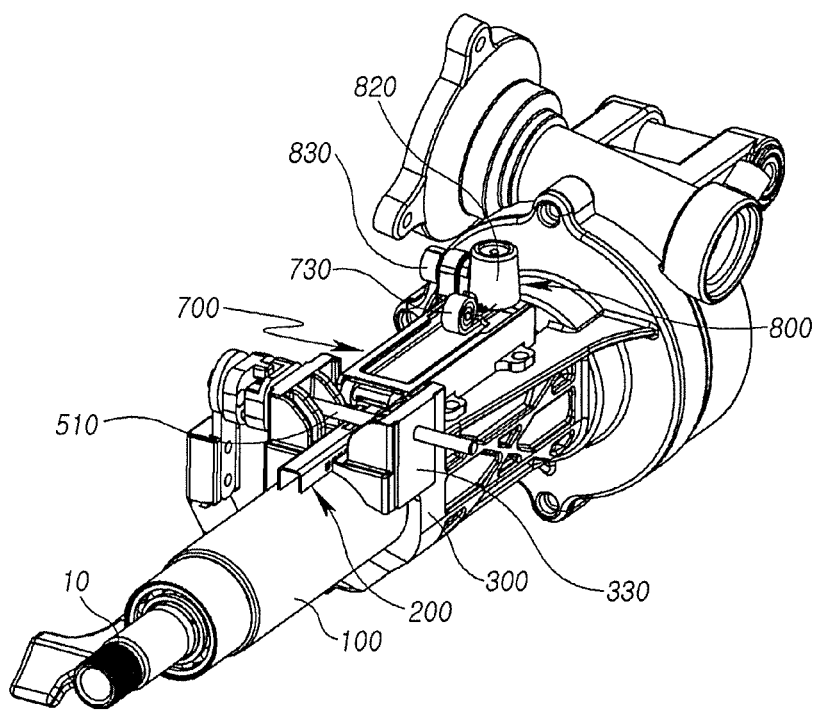
FIG. 2 is a perspective view of the steering column of a vehicle according to embodiments with some parts removed.
Figure 3:
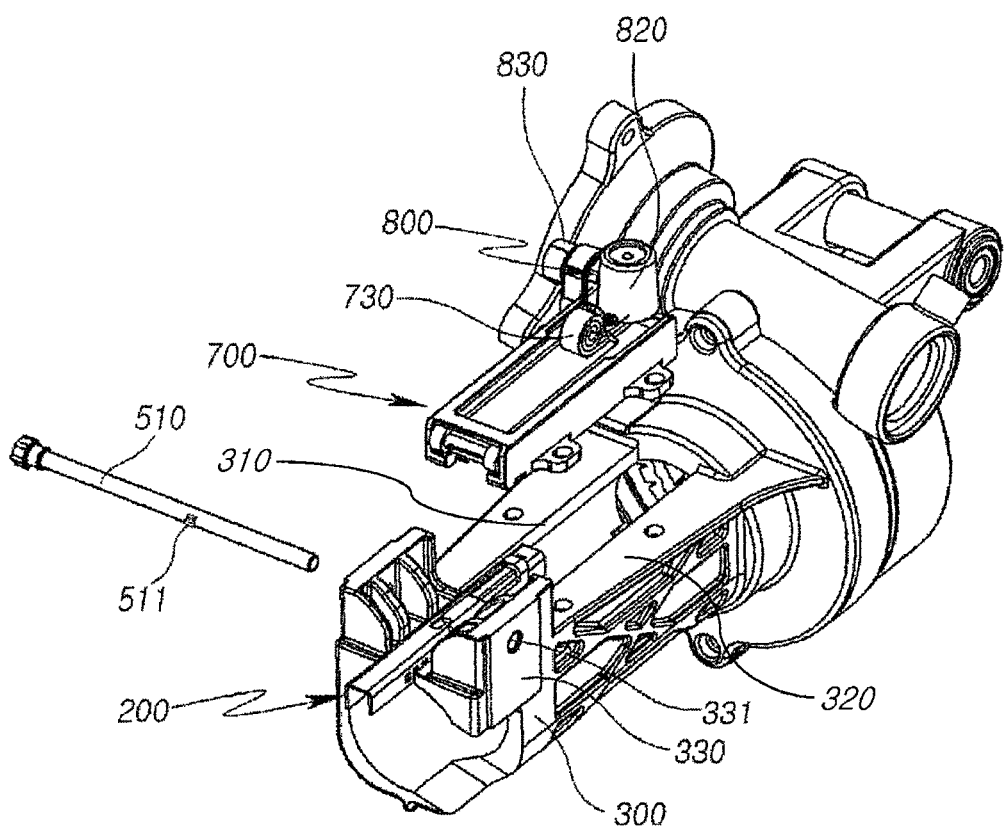
FIGS. 3 to 5 are exploded perspective view of the steering column of a vehicle according to embodiments.
Figure 4:
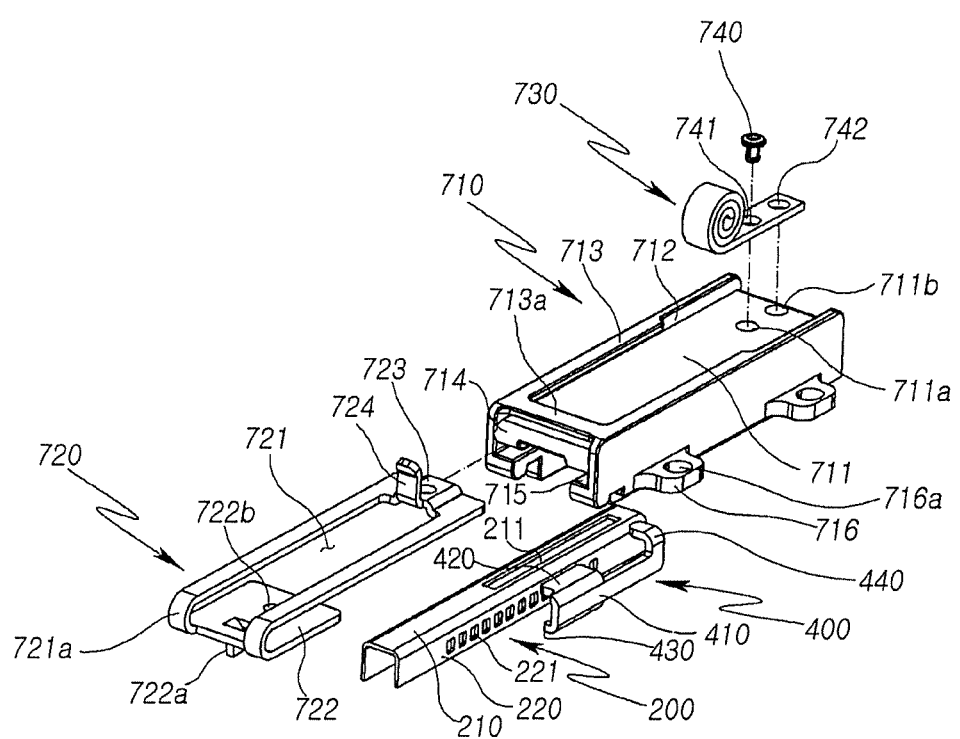
Figure 5:
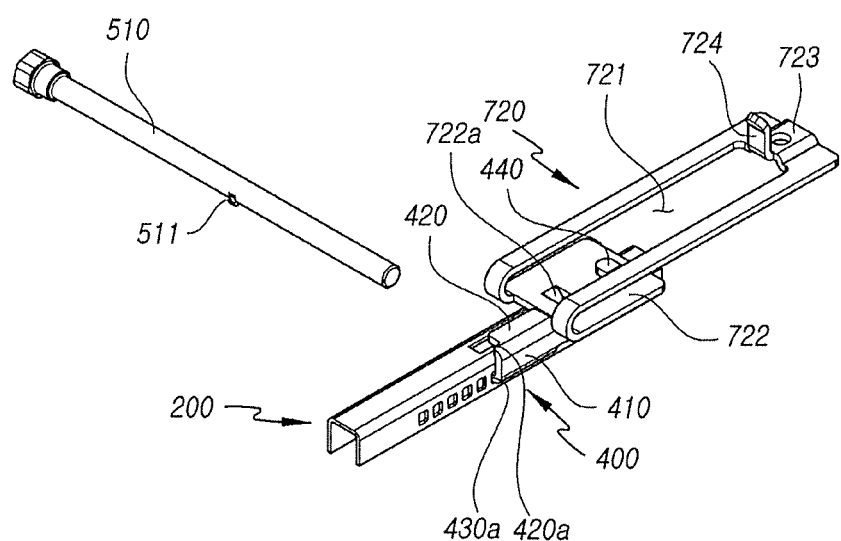
Figure 6:
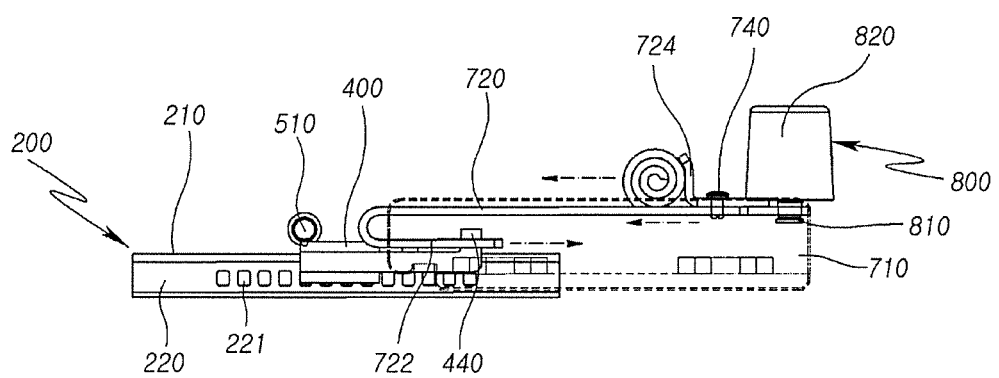
FIGS. 6 and 7 are schematic views showing a first mode-operation state of the steering column of a vehicle according to embodiments.
Figure 7:
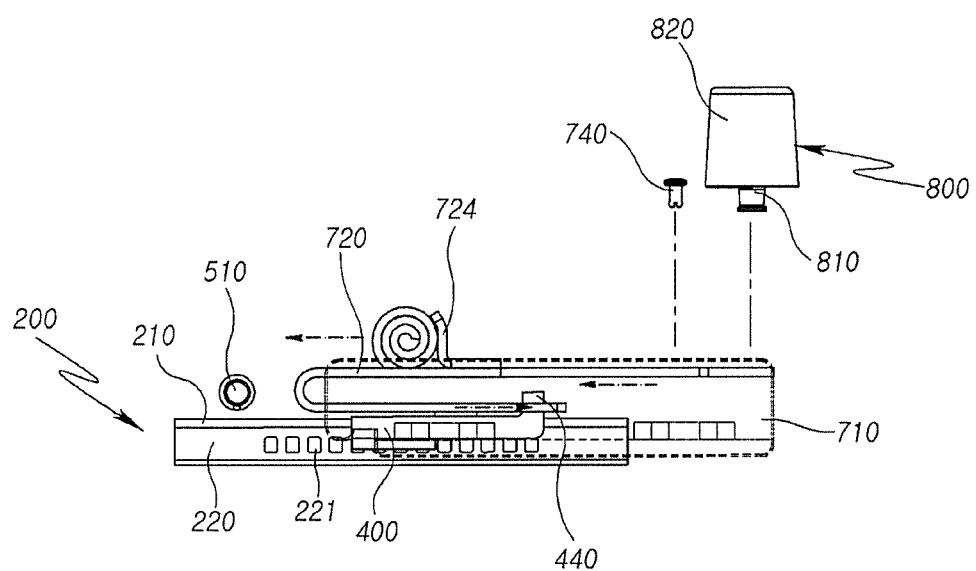
Figure 8:
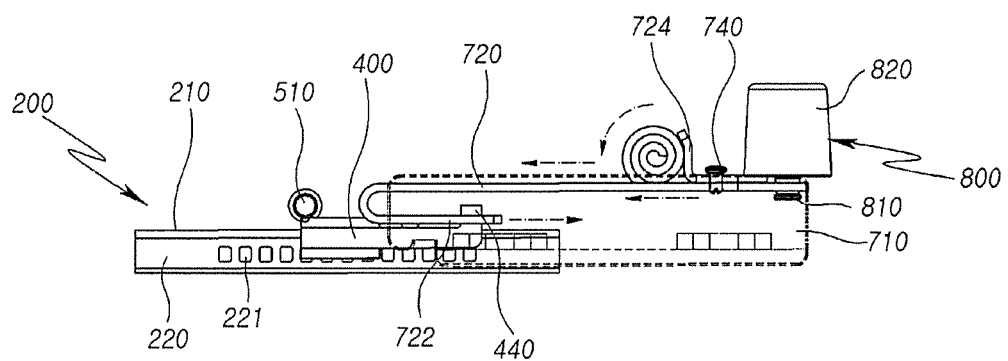
FIGS. 8 and 9 are schematic views showing a second mode-operation state of the steering column of a vehicle according to embodiments.
Figure 9:
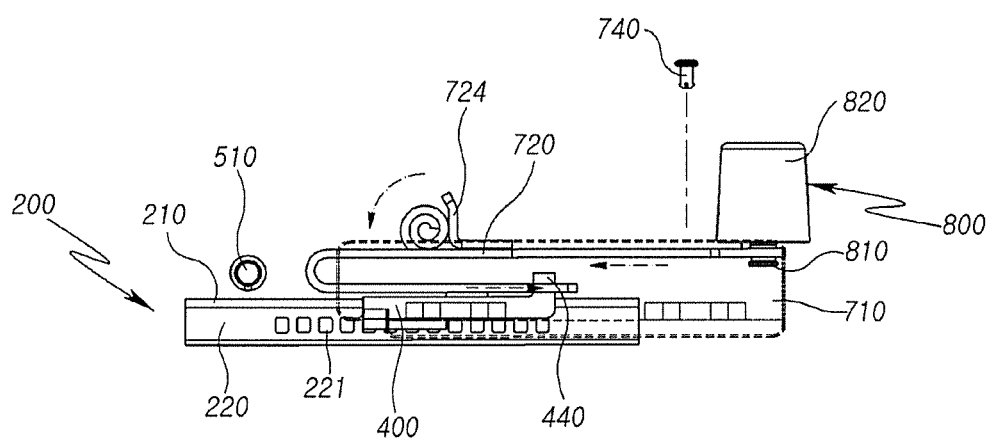

FIG. 1 is a perspective view of a steering column of a vehicle according to embodiments, FIG. 2 is a perspective view of the steering column of a vehicle according to embodiments with some parts removed, FIGS. 3 to 5 are exploded perspective views of the steering column of a vehicle according to embodiments, FIGS. 6 and 7 are schematic views showing a first mode-operation state of the steering column of a vehicle according to embodiments, and FIGS. 8 and 9 are schematic views showing a second mode-operation state of the steering column of a vehicle according to embodiments.

First, referring to FIGS. 1 to 5, a steering column of a vehicle according to embodiments includes an inner tube 100, a fixed gear 200, an outer tube 300, a movable gear 400, a control lever 500, a locking unit 600, and a load-absorbing unit 700.

The inner tube 100 is substantially a hollow cylinder and a steering shaft 10 is disposed in the inner tube 100.

The fixed gear 200 is elongated in the axial direction of the steering column on the outer side of the inner tube, so when the inner tube 100 telescopes in the outer tube 300 in the axial direction of the steering column, the fixed gear 200 is engaged with or disengaged with the movable gear 400, thereby guiding the inner tube 100 telescoping.

The fixed gear 200 may be fixed to the outer side of the inner tube 100 by welding or separate fixing members.

The fixed gear 200 has generally a Π-shaped cross-section. That is, the fixed gear 200 has a top 210 and sides 220 bending from both ends of the top 210 and fixed to the outer side of the inner tube 100.

A telescopic motion guide hole 211 is formed through the top 210 and elongated in the axial direction of the steering column and a plurality of telescopic motion stop holes 221 are formed with regular intervals through any one of the sides 220, so a locking projection 430 of the movable gear 400 to be described below can be inserted and fixed in the telescopic motion stop holes 221.

The outer tube 300 is fixed to a car body by a mounting bracket 30 and the inner tube 100 telescopes therein by sliding in the axial direction of the steering column, so a collapse motion is possible in a collision of a vehicle.

That is, when a lever bolt 510 that is rotated with the control lever 500 is loosened, the inner tube 100 is slid into of out of the outer tube 300. The outer tube 300 has a cut portion 310 and the cut portion is positioned over the fixed gear 200.

A support flange 320 that is a substantially flat plate is formed on both sides of the cut portion 310. The support flanges 320 are coupled to and support the load-absorbing unit 700. Distance members 330 radially facing each other are disposed at on the outer side of a first end of the outer tube 300. The distance members 330 are provided in pairs and symmetrically arranged with the cut portion 310 therebetween.

For example, the distance members 330 may be integrally formed with the outer tube 300 or may be separately manufactured and then combined with the outer tube 300. A tilting bracket 20 may be disposed outside the distance members 330 and can contribute to changing the tilting angle of the steering column.

A bolt hole 311 is formed through the distance members 330 to insert a lever bolt 510 through them. The distance from the center of the steering column to the bolt holes 311 may be larger than the distance from the center of the steering column to the top 210 of the fixed gear 200. Accordingly, the lever bolt 510 of the control lever 500 may be disposed at a position where there is no interference with the fixed gear 200.

The movable gear 400 is coupled to the fixed gear 200 to restrict a telescopic motion of the steering column or is separated from the fixed gear 200 to allow for a telescopic motion of the steering column. The movable gear may be made of spring steel having sufficient strength and elasticity.

The movable gear 400 is disposed between the side 220 with the telescopic motion stop holes 221 of the fixed gear 200 and the distance member 330 facing the side 220.

The movable gear 400 has a movable gear body 410, a guide 420 bending from the upper end of the body 410 toward the top 210, the locking projection 430 protruding from the lower end of the movable gear body 410 toward the side 220 of the fixed gear 200 to be inserted into or separated out of the telescopic motion stop hole 221 of the fixed gear 200, and a fixed shaft 440 formed at an end of the movable gear body 410 to be a rotational center when the lever bolt 510 is tightened or loosened.

The movable gear body 410 may be disposed to face the side 220 of the fixed gear 200. The locking projection 430 is inserted into or separated out of the telescopic motion stop holes 221 of the fixed gear when the lever bolt 510 is tightened and loosened. That is, as the locking projection 430 is inserted into the telescopic motion stop holes 221, a restricting force for the telescopic motion of the steering column can be obtained.

The control lever 500 is rotated with the lever bolt 510 and a driver can telescope the steering column by operating the control lever 500. The control lever 500 and the lever bolt 510 may be combined with each other by a cam unit for an organic combination thereof.

The lever bolt 510 is disposed through the pair of distance members 330. A first end of the lever bolt 510 can be coupled to the control lever 500 by a cam unit etc., and a second end protrudes out of one of the distance members 330. A thread for fastening the locking unit 600 is formed on the outer side of the portion, which protrudes out of the distance member 330, of the lever bolt 510.

A projective step 511 is formed at substantially middle portion of the lever bolt 510. The projective step 511 supports the movable gear 400 by the movement amount of the cam unit such that the movable gear 400 is separated from the fixed gear 200, when the lever bolt 510 is rotated in a predetermined direction.

A bolt support seat 420a that supports the projective step 511 of the lever bolt 510 is formed at an end of the guide 420. Accordingly, when the lever bolt 510 is loosened and the bolt support seat 420a supports the projective step 511, the movable gear 400 is rotated about the fixed shaft 440 and the locking projection 430 is separated out of the telescopic motion stop holes 221, whereby a telescopic motion becomes possible.

The locking unit 600 is coupled to the end, which protrude out of the movable gear 400, of the lever bolt 510. For example, the locking unit 600 may include a lock nut fastened to the end of the lever bolt 510, and a bearing and a washer may be disposed between the movable gear 400 and the lock nut.

Meanwhile, the load-absorbing unit 700 that absorbs a collision load in a collision or a rear-end collision of a vehicle includes a guide block 710 fixed to the support flanges 320 of the outer tube 300, a first load-absorbing member 720 disposed inside the guide block 710 and sliding in the axial direction of the steering column, and a second load-absorbing member 730 disposed on the guide block 710 and moving with the first load-absorbing member 720.

The guide block 710 is disposed on the support flanges 320 of the outer tube 300. The guide block has a guide plate 711 having a rectangular shape when seen from above, and a first end portion of the first load-absorbing member 720 is seated on the top of the guide plate 711.

The first load-absorbing member 720 move straight on the guide plate 711 of the guide block 710 in the axial direction of the steering column and the guide plate 711 of the guide block 710 supports the first load-absorbing member 720 such that the first load-absorbing member 720 can be moved.

A first coupling hole 711a in which a coupling member 740 such as a rivet is inserted is formed at a first end of the top of the guide plate 711. A second coupling hole 711b is formed close to the first coupling hole 711a. An inflator pin to be described below is inserted in the second coupling hole 711b. A bending guide portion 714 having a predetermined curvature is formed at a first end of the guide plate 711. The bending guide portion 714 guides a second end portion of the first load-absorbing member 720 to be bent and moved.

A stopping step 712 protruding upward from the guide plate 711 is formed at both sides in the width direction of the guide block 710. The stopping step 712 guides the first load-absorbing member 720 on the guide block 710 to be moved in the collapse direction in a collision of a vehicle and prevents the first load-absorbing member 720 from being separated outside in the width direction of the guide block 710.

Stopping flanges 713 protruding toward the inside of the guide block 710 may be formed on the stopping steps 712. The stopping flanges 713 prevent the first load-absorbing member 720 from being separated upward from the guide block 710 by supporting the top of the first load-absorbing member 720 moving for collapse.

A connection flange 713a connecting the stopping flanges 713 in the width direction is formed at the end of the guide block 710 at the position where the bending portion 721a of the first load-absorbing member 720 is supported.

A space is defined between the connection flange 713a and the bending guide portion 714, so the connecting flange 713a firmly supports the top and bottom of the first load-absorbing member 720 together with the bending guide portion 714 when the first load-absorbing member 720 is moved for collapse, whereby bending occurs with a predetermined curvature and collision load is absorbed.

The guide block 710 has support portions 715 formed in the longitudinal direction, that is, in the axial direction of the steering column, on the lower end therein. The support portions 715 face each other on both inner sides of the guide block 710 and a space is defined between the support portions 715 and the bending guide portion 714, so a fixed portion 722 that is the second bending end portion of the first load-absorbing member 720 is inserted and supported in the space. That is, the first end portion of the first load-absorbing member 720 is inserted between the connecting flange 713a and the bending guide portion 714 and the second end portion of the first load-absorbing portion 720 is inserted between the bending guide portion 714 and the support portions 715, thereby supporting the fixed portion 722 of the first load-absorbing member 720 (described below) when the first load-absorbing member 720 is moved straight for collapse in the axial direction of the steering column in a collision of a vehicle.

At least one fastening portion 716 is formed on both sides in the width direction of the guide block 710. A fastening hole 716a is formed through the fastening portions 716 and fasteners (not shown) such as a screw can be inserted in the fastening holes 716a. The fasteners are coupled to the support flanges 320 of the outer tube 320 through the fastening holes 716a, thereby fixing the guide block 710 to the outer tube 300.

The first end portion of the first load-absorbing member 720 is seated on the top of the guide block 710. The second end portion of the first load-absorbing member 720 is bent by the bending guide portion 714 of the guide block 710. That is, the first end and the second end of the first load-absorbing member 720 are bent in the same direction.

Accordingly, the first load-absorbing member 720 may be made of a material, for example, metal having elasticity such that it can be at least bent. A hollow portion 721 elongated in the longitudinal direction is formed substantially at the center portion of the first load-absorbing member 720. The hollow portion 721 prevents interference by the first load-absorbing member 720 when the second load-absorbing member 730 is loosened.

The first load-absorbing member 720 has the fixed portion 722 coupled to the movable gear 400 at the first end and the first end of the first load-absorbing member 720 is coupled to the guide plate 711 of the guide block 710 and the second load-absorbing member 730 by the coupling member 740 such as a rivet.

The fixed portion 722 formed at the second end portion of the first load-absorbing member 720 is bent downward by the bending guide portion 714 of the guide block 710, is inserted between the bending guide portion 714 and the support portions 715, and has a stopper 722a protruding downward from the bottom thereof.

The stopper 722a is inserted in the telescopic motion guide hole 211 of the fixed gear 200. The stopper 722a is moved in the telescopic motion guide hole 211 to guide the steering column that telescopes, and limits the telescopic motion distance of the steering column within the set distance of the telescopic motion guide hole 211.

A slit 722b is formed through the fixed portion 722 at a position where there is no interference with the stopper 722a and the fixed shaft 440 of the movable gear 400 can be inserted in the slit 722b. Accordingly, the fixed shaft 440 of the movable gear 400 is coupled to the fixed portion 722 to protrude upward, so it functions as a rotational shaft of the movable gear 400.

A second pressing portion 724 is formed at the first end of the first load-absorbing member 720. The second pressing portion 724 bends and protrudes upward at the second end of the first load-absorbing member 720, thereby pressing the second load-absorbing member 730.

The second load-absorbing member 730 is rolled and disposed on the guide plate 711 of the guide block 710. The second load-absorbing member 730 is pressed by the second pressing portion 724 when the first load-absorbing member 720 is moved for collapse due to external shock such as in a collision of a vehicle, so the second load-absorbing member 730 is unrolled in the hollow portion 721 of the first load-absorbing member 720, thereby absorbing a collision load.

Accordingly, the second load-absorbing member 730 may be made of a material, for example, metal having predetermined elasticity. A stepped portion 723 having a thickness corresponding to the thickness of the second load-absorbing member 730 may be formed at an edge end, which is coupled to the second load-absorbing member 730, of the first load-absorbing member 720. The stepped portion 723 may have a height corresponding to the thickness of the second load-absorbing member 730. Accordingly, a first end of the second load-absorbing member 730 is positioned between the stepped portion 723 and the guide plate 711 of the guide block 710.

A first hole 741 is formed at a first end of the second load-absorbing member 730. The coupling member 740 such as rivet is inserted in the first hole 741 and can be fastened to the stepped portion 723 of the first load-absorbing member 720 and the first coupling hole 711a of the guide block 710. The coupling member 740 may be cut when shock over a predetermined value is applied.

A second hole 742 is formed at the first end of the second load-absorbing member 730 at a position where there is no interference with the first hole 741. The inflator pin 810 to be described below is inserted and can be fastened to the second coupling hole 711b of the guide block.

The second load-absorbing member 730 can be coupled to the guide block 710 by the inflator unit 800. The inflator unit 800 may include the inflator pin 810 and a pin housing 820.

The inflator pin 810 is coupled to the guide block 710 through the first end of the second load-absorbing member 730. Accordingly, the second load-absorbing member 730 can be fixed to the guide block 710 by the inflator pin 810. The inflator pin 810 can be separated from the guide block 710 and the second load-absorbing member 730 in response to a signal from a shock sensor etc. that transmits a signal, for example, an airbag system.

The pin housing 820 is disposed outside the inflator pin 810 to receive it. A through-hole for separating the inflator pin 810 is formed through the top of the pin housing 820. A connector 830 may be connected to a side of the pin housing 820. The connector 830 can transmit a signal to the inflator 810 upon receiving the signal from the shock sensor etc.

According to the steering column of a vehicle which as the configuration of the embodiments, when the control lever 500 is operated, the lever bolt 510 is rotated in a predetermined direction, and the projective step 511 presses the movable gear 400, the movable gear 400 is moved way from the fixed gear 200 and a telescopic motion-locked state is changed into a telescopic motion-unlocked state from a locked state, so a driver can telescope the steering column.

However, the driver should change the telescopic motion-unlocked state into the telescopic motion-locked state after adjusting the length of the steering column to fit the shape of his/her body. Accordingly, when the control lever 500 is operated, the lever bolt 510 is rotated counterclockwise, and the projective step 511 no longer presses the movable gear 400, the movable gear 400 is rotated about the fixed shaft 440 by its elasticity and the locking projection 430 is coupled to the fixed gear 200. Accordingly, the locking projection 430 of the movable gear is stably inserted in the telescopic motion stop holes 221 of the fixed gear 200, thereby locking the lever bolt 510.

However, in some cases, the locking projection 430 of the movable gear 400 may be positioned between the telescopic motion stop holes 221 of the fixed gear 200 in the telescopic motion-locked state. Even in this case, the movable gear 400 presses the fixed gear 200 by its elasticity, and when predetermined shock etc. is applied in the axial direction of the steering column, the locking projection 430 of the movable gear 400 is slid and inserted into an adjacent telescopic motion stop hole 221 of the fixed gear 200, so the lever bolt 510 can be stably locked.

FIGS. 6 and 7 show a first mode-operation state of the shock-absorbing unit when a relatively small load is applied in comparison to a second mode-operation state to be described below even though a collision or a rear-end collision of a vehicle occurs.

Referring to FIGS. 6 and 7, when a collision load is applied from the outside, the inner tube 100 is moved into the outer tube 300 in the axial direction (collapse direction) of the steering column.

When the collision load applied from the outside corresponds to a load within a set range, the coupling member 740 is cut and the inflator pin 810 is separated from the second load-absorbing member 730. The coupling member 740 is manufactured to have strength such that it is cut when a collision load corresponds to a load within the set range.

As the inner tube 100 is moved toward the outer tube 300, the movable gear 400 coupled to the fixed gear 200 is also moved toward the outer tube 300.

As the movable gear 400 is moved toward the outer tube 300, the first load-absorbing member 720 coupled to the movable gear 400 is also moved to a side in the axial direction of the steering column with the stopper 722 inserted and guided in the telescopic motion guide hole 211 of the fixed gear 200. That is, the fixed portion 722 of the first load-absorbing member 720 coupled to the movable gear 400 is also moved toward the outer tube 300, so the first load-absorbing member 720 is guided to the outer tube 300 by the bending guide portion 714 of the guide block 710.

In this process, the collision load applied from the outside is absorbed by plastic deformation of the first load-absorbing member 720 bending and moving along the guide block 710, so the load that can be applied to a driver can be remarkably reduced. In this process, the second load-absorbing member 730 remains rolled on the guide block 710.

FIGS. 8 and 9 show the second mode-operation state of the load-absorbing unit when a large load is applied to the steering column in comparison to the first mode-operation state due to a collision or a rear-end collision of a vehicle.

Referring to FIGS. 8 and 9, when a collision load larger than pressure within a set range of the first mode-operation state is applied, the coupling member 740 is cut and the inflator pin 810 remains coupled to the second load-absorbing member 730 and the guide block 710. The coupling member 740 is manufactured to have strength such that it is cut when a collision load is a load within the set range or more.

The inner tube 100 is moved into the outer tube 300, and as the inner tube 100 is moved toward the outer tube 300, the movable gear 400 coupled to the fixed gear 200 is also moved toward the outer tube 300.

As the movable gear 400 is moved toward the outer tube 300, the first load-absorbing member 720 coupled to the movable gear 400 is also moved to a side in the axial direction of the steering column with the stopper 722 inserted and guided in the telescopic motion guide hole 211 of the fixed gear 200. That is, the fixed portion 722 of the first load-absorbing member 720 coupled to the movable gear 400 is also moved toward the outer tube 300, so the first load-absorbing member 720 is guided to the outer tube 300 by the bending guide portion 714 of the guide block 710. Further, the pressure applied to the steering column is primarily absorbed by plastic deformation of the first load-absorbing member 720 bending and moving along the guide block 710.

Further, since the second load-absorbing member 730 is fixed at the first end to the guide block 710 by the inflator pin 810, it is pressed by the pressing portion 724 when the first load-absorbing member 720 is moved. Accordingly, the rolled second load-absorbing member 730 is gradually unrolled and moved in the movement direction of the first load-absorbing member 720 when the first load-absorbing member 720 is moved. Accordingly, the collision load applied to the steering column is secondarily absorbed by the second load-absorbing member 730.

As described above, the collision load applied to the steering column is absorbed by both the first load-absorbing member 720 and the second load-absorbing member 730 that are moved along the guide block 710, whereby it is possible to more strongly secure the safety of a driver.

The above description is provided as an exemplary embodiment of the present disclosure and it should be understood that the present disclosure may be easily modified in other various ways without changing the spirit or the necessary features of the present disclosure by those skilled in the art.

Therefore, the embodiments described above are only examples and should not be construed as being limitative in all respects. For example, the components described as a single part may be divided and the components described as separate parts may be integrated.

The scope of the present disclosure is defined by the following claims, and all of changes and modifications obtained from the meaning and range of claims and equivalent concepts should be construed as being included in the scope of the present disclosure.

What is claimed is:

1. A steering column of a vehicle, the steering column comprising:
    a fixed gear disposed on an outer side of an inner tube, in which a steering shaft is inserted, in an axial direction of the steering column, and having a plurality of telescopic motion stop holes arranged in the axial direction of the steering column on a first side of the fixed gear;
    a movable gear inserted into or separated out of the plurality of telescopic motion stop holes on the first side of the fixed gear;
    an outer tube fitted on the inner tube such that the inner tube can slide in the axial direction of the steering column, and having distance members disposed at the first side of the fixed gear and a second side of the fixed gear;
    a lever bolt disposed through the distance members and supporting the movable gear such that the fixed gear and the movable gear are coupled to or separated from each other when a control lever is tightened or loosened; and
    a load-absorbing unit comprising a guide block coupled to the outer tube and a first load-absorbing member coupled to the movable gear to be able to slide in the axial direction of the steering column on the guide block.

2. The steering column of claim 1, wherein a fixed portion having a slit coupled to the movable gear is disposed at a first end of the first load-absorbing member and is bent downward under the guide block.

3. The steering column of claim 2, wherein the guide block has a guide plate guiding the first load-absorbing member and a bending guide portion supporting and guiding a bending portion of the first load-absorbing member to be bent is formed at a first end of the guide plate.

4. The steering column of claim 3, wherein support portions are formed under the bending guide portion in the axial direction of the steering column to support both sides of the fixed portion when the first load-absorbing member slides.

5. The steering column of claim 2, wherein the fixed gear has a top disposed on the outer side of the inner tube in the axial direction of the steering column, and the first and second sides of the fixed gear are bent from both ends of the top and fixed to the outer side of the inner tube, and
    a telescopic motion guide hole extends through the top in the axial direction of the steering column.

6. The steering column of claim 5, wherein the movable gear has:
    a movable gear body disposed to face the first side;
    a guide disposed over the movable gear guide and seated on the top; and
    a locking projection disposed at the lower portion of the movable gear body to be inserted into the plurality of telescopic motion stop holes.

7. The steering column of claim 6, further comprising a fixed shaft extending from the movable gear body in the axial direction of the steering column and having a bending end to be rotatably supported in the slit.

8. The steering column of claim 5, wherein a topper inserted in the telescopic motion guide hole is formed on the bottom of the fixed portion.

9. The steering column of claim 1, further comprising a second load-absorbing member having a first end coupled to the first load-absorbing member and the guide block and a second end rolled on the guide block.

10. The steering column of claim 9, further comprising a coupling member coupling the second load-absorbing member to the first load-absorbing member and the guide block, wherein the coupling member is cut when a load over a set range is applied.

11. The steering column of claim 10, further comprising an inflator unit comprising an inflator pin fixing the second load-absorbing member to the guide block and a pin housing receiving the inflator pin,
    wherein the inflator pin is separated from the guide block and the second load-absorbing member when a load applied from the outside reaches a load in a set range.

12. The steering column of claim 9, further comprising a pressing portion bending upward at a second end of the first load-absorbing member to press the second load-absorbing member.

13. The steering column of claim 1, wherein the outer tube has a cut portion between the distance members, and a support flange to which the load-absorbing unit is coupled is formed at both sides of the cut portion.

14. The steering column of claim 1, wherein a projective step supporting a first end of the movable gear outward from the fixed gear when the control lever is loosened is formed on the outer side of the lever bolt.

15. The steering column of claim 1, wherein a stopping step protruding upward is formed at both sides in a width direction of the guide block.

16. The steering column of claim 15, wherein stopping flanges are formed toward the inside of the guide block on the stopping step.

17. The steering column of claim 16, wherein a connecting flange connecting both sides of the stopping flanges is formed at an end of the guide block.

18. The steering column of claim 1, wherein the first load-absorbing member is slidably disposed on the guide block on a top of the fixed gear.

\* \* \* \* \*